United States Patent [19]

Hori et al.

[11] 4,091,157

[45] May 23, 1978

[54] HEAT-CURABLE COMPOSITE ADHESIVE SHEET AND METHOD FOR MAKING

[75] Inventors: Yutaka Hori; Hidekazu Takahashi; Makoto Sunakawa; Ichiro Ijichi; Kiyohiro Kamei, all of Ibaraki, Japan

[73] Assignee: Nitto Electric Industrial Co., Ltd., Ibaraki, Japan

[21] Appl. No.: 655,198

[22] Filed: Feb. 4, 1976

[30] Foreign Application Priority Data

Mar. 27, 1975 Japan .................................. 50-37611
Apr. 16, 1975 Japan .................................. 50-46663

[51] Int. Cl.$^2$ ........................... B32B 7/10; C09J 5/04
[52] U.S. Cl. .................................... 428/196; 427/207; 427/390; 428/35; 427/391; 260/27 R; 428/201; 260/29.7 R; 260/878 R; 428/202; 428/215; 428/246; 428/286; 428/287; 428/303; 428/315; 428/311; 428/332; 428/337; 428/450; 428/346; 428/401; 428/414; 428/425; 428/441; 428/442; 428/454; 428/515; 428/516; 428/517; 428/518; 428/519; 428/520; 428/511; 156/306; 156/332; 156/334; 156/330; 156/247

[58] Field of Search ............... 428/414, 441, 442, 515, 428/516, 520, 303, 315, 311, 337, 332, 346, 401, 454, 425, 517, 518–520, 196, 201, 215, 246, 286, 287; 156/330, 332, 334, 306

[56] References Cited

U.S. PATENT DOCUMENTS

| | | | |
|---|---|---|---|
| 2,633,432 | 3/1953 | Kenneway, Jr. ................. | 428/914 X |
| 3,177,090 | 4/1965 | Bayes et al. ..................... | 428/414 |
| 3,508,951 | 4/1970 | Shimp et al. .................... | 428/414 |
| 3,708,379 | 1/1973 | Funt ................................. | 428/420 X |
| 3,812,005 | 5/1974 | Katagiri et al. ................. | 428/414 X |

OTHER PUBLICATIONS

J. Pirog, IBM Tech. Disclosure Bulletin, vol. 12, No. 4, Sep. 1969.

*Primary Examiner*—P. C. Ives
*Attorney, Agent, or Firm*—Sughrue, Rothwell, Mion, Zinn and Macpeak

[57] ABSTRACT

A heat-curable multilayer composite sheet comprising a layer comprising one or more unsaturated compounds which are normally solid or liquid free radical reactive unsaturated compounds and a layer comprising a normally solid or liquid free radical initiator, the layers being bonded to each other as a laminate as separate layers at a temperature at which the free radical initiator does not lose its free radical reaction initiating capability, and, a process for preparing a heat-curable multilayer composite sheet, which comprises coating a layer-forming material containing a normally solid or liquid free radical reactive unsaturated compound on a strippable sheet to form an unsaturated compound material layer on the strippable sheet, coating a layer-forming material containing a normally solid or liquid free radical initiator on a strippable sheet to form a free initiator layer on the strippable sheet, bringing the unsaturated compound material layer into contact with the free radical initiator layer, and bonding them to each other at a temperature at which the free radical initiator layer does not lose its free radical reaction initiating ability.

64 Claims, 7 Drawing Figures

HEAT-CURABLE COMPOSITE ADHESIVE SHEET AND METHOD FOR MAKING

BACKGROUND OF THE INVENTION

1. Field of the Invention

This invention relates to a composite sheet curable by a free radical reaction at relatively low temperatures within relatively short periods of time, and its object is to provide a composite sheet useful as an adhesive sheet or a surface layer-forming material of a sheet material such as a decorative sheet.

2. Description of the Prior Art

In recent years there has been a strong demand for increased simplification, or improving safety and sanitation in bonding operations in the adhesive field, and heat-curable adhesive sheets have widely superseded the old liquid adhesives. These heat-curable adhesive sheets, however, have the defect that high temperatures and long periods are required in order to obtain good adhesive strength.

For example, some epoxy resin adhesive sheets require heating at 150° C for 2 to 3 hours, and the support is likely to be deteriorated as a result of heating at such high temperatures for such long times.

On the other hand, hot-melt adhesive sheets have been sold on the market as adhesive sheets that permit bonding within relatively short periods of time, but since their bond strength at high temperatures is poor, such adhesive sheets are not commercially significant.

Furthermore, in order to protect, decorate, or smooth the surface of a wooden sheet, metal sheet, plastic sheet or plywood, it has been the practice to heat bond to the surface thereof a surface layer-forming material prepared by impregnating a mixture of a thermosetting resin such as a phenol or melamine resin and a curing agent in a paper sheet, non-woven fabric or woven fabric. However, since this surface layer-forming material contains a thermosetting resin and a curing agent in the mixed state, its shelf life is poor.

The shelf life of such a surface layer-forming material could be prolonged by a proper choice of the curing agent, but the resulting surface layer-forming material has the defect that it requires relatively high temperatures and long periods of time to bond to the surface of a sheet material while heating, and, thus, the sheet material is undesirably deteriorated.

SUMMARY OF THE INVENTION

We investigated composite sheets having a long shelf life obtainable by, for example, enclosing a free radical initiator or curing catalyst in microcapsules (contact preventing walls) and then mixing the microcapsules with a material which contains at least one unsaturated bond, or laminating a free radical initiator or curing catalyst and a material which contains at least one unsaturated bond through a contact preventing film of a thermoplastic resin. Since, however, the free radical initiator or curing catalyst is caused to act after the melting and breaking down of the partitioning film for the microcapsules, extra time is required, not only for melting and breaking but also to allow the free radical initiator or curing catalyst to uniformly mix with the material which contains at least one unsaturated bond after the melting and breaking.

In view of the state of the art, we performed extensive research in order to obtain a composite sheet having a long shelf life which is curable at relatively low temperatures within short periods of time, and, as a result, produced a composite sheet which effectively utilizes a free radical reaction to accomplish the present invention.

We have found that when a layer-forming unsaturated compound material containing a normally solid or liquid free radical reactive unsaturated compound (to be referred to as an unsaturated compound) and a layer-forming initiator material containing a normally solid or liquid free radical initiator (to be referred to as an initiator) are formed into separate layers at a temperature which does not cause a loss of the radical reaction initiating ability of the initiator material, the resulting heat-curable multi-layer composite sheet has a long shelf life and is curable within short periods of time.

BRIEF DESCRIPTION OF THE ACCOMPANYING DRAWINGS

DETAILED DESCRIPTION OF PREFERRED EMBODIMENTS

Figure 1:
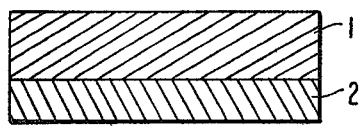
FIGS. 1 to 5 are sectional views of composite sheets in accordance with this invention.

The unsaturated compound used in this invention is solid or liquid at room temperature, and, if desired, a non-reactive carrier may be added thereto in order to impart layer-forming ability to give a composite sheet.

The term "layer-forming" or "layer-forming ability" as is used in the present application means that the unsaturated compound material layer or initiator material layer does not become flowable at room temperature, but has a layer-retaining ability. Usually, this refers to the state where such materials have a high viscosity, e.g., at least about $10^7$ poises, preferably at least about $10^9$ poises (for example, the state of a pressure-sensitive adhesive), or is solid.

The details of the non-reactive carrier will be described later.

The unsaturated compound used in the present invention may be a specific unsaturated compound used alone, or a mixture of various unsaturated compounds. When used alone, it is desirably an unsaturated compound containing at least 2 double bonds per molecule. When a mixture is used, at least one constituent of the mixture is desirably an unsaturated compound containing at least 2 double bonds per molecule. This is for the purpose of obtaining a cured layer having a cross-linked molecular structure upon heating the resulting composite sheet.

Generally, the unsaturated compound includes unsaturated polymers having a molecular weight of about 5,000 to about 50,000 (including oligomers having a molecular weight of about 1,000 to about 5,000) and unsaturated monomers having a molecular weight of about 100 to about 300. A suitable amount of monomer(s) used is from about 0.1 to about 100% by weight per weight of the polymer(s) used. The unsaturated compound used in this invention is preferably an unsaturated polymer containing at least two double bonds per molecule, a mixture of such a polymer and an unsaturated monomer, or a mixture of such a polymer and an unsaturated polymer containing 1 double bond per molecule.

Whether the unsaturated compound is used alone or as a mixture with a non-reactive carrier, it suitably contains at least about $10^{19}$, and for commercial purposes, about $10^{20}$ to about $8 \times 10^{21}$, double bonds per gram.

The amount of the initiator used in this invention can be determined substantially by a stoichiometric calculation from the number of the double bonds of the unsaturated compound so that the resulting composite sheet may be cured at relatively low temperatures within short periods of time.

Examples of the composite sheet obtained in accordance with this invention are shown in the accompanying drawings.

FIGS. 1 to 5 are sectional views of composite sheets in accordance with this invention wherein, in FIGS. 1 to 4, 1 represents an unsaturated compound layer, 2 represents an initiator layer and 3 represents a fibrous base material impregnated with initiator(s).

In the composite sheet obtained in accordance with the present invention, a layer of the unsaturated compound material and a layer of the initiator material merely make contact at their surfaces and are substantially separated from each other. Hence, the composite sheet can be stored for long periods of time. When in use, the sheet is pressed at about 80 to about 120° C for about 5 seconds to about 5 minutes, whereby the unsaturated compound material and the initiator material are melted and mixed and undergo a free radical reaction. Consequently, the unsaturated compound has a three-dimensional molecular structure by a polymerization reaction, a cross-linking reaction, a hydrogen-extracting reaction, etc., to form a cured layer having superior mechanical strength and good bond strength.

Advantageously, the unsaturated compound used in this invention is an acrylic unsaturated polymer expressed by the following formula:

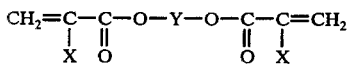

wherein X is a hydrogen atom or methyl group, and Y is a residue of a member selected from the group consisting of polyesters, polyurethanes, epoxy compounds and polyglycols, most preferably having from about 100 to about 300 carbon atoms, which contain a (meth)acrylic acid group at both ends of the molecule and which have a molecular weight of not more than about 5,000, preferably about 1,000 to about 5,000.

Such acrylic unsaturated polymers are commercially available, for example, under the trade names Oligoacrylate TO-1, TO-3, TO-4, ND-1, and ND-2 (products of Toa Gosei Kagaku Kogyo K.K., which include a polyester in the main molecular chain), Oligoacrylate ND-3 (a product of Toa Gosei Kagaku, which contains a polyurethane in the main molecular chain), Ripoxy RT-802 and VR 90X (products of Showa Kobunshi K.K., which contain an epoxy compound in the main molecular chain), Light Ester BP-4 (a product of Kyoeisha Yushi Kagaku K.K., which contains an epoxy compound in the main molecular chain), and NK Ester 4G, 3G, 2G, and P-2G (products of Shin Nakamura Kagaku K.K., which include a polyglycol in the main molecular chain).

Acrylic unsaturated polymers available under the trade names Aronix M-5500, M-5700, M-6100, M-6300, M-8030 and M-8060 (products of Toa Gosei Kagaku Kogyo K.K.) and Ripoxy F-900 and 840 (products of Showa Kobunshi Kagaku K.K.) can also be used as the unsaturated compound in the present invention.

A mixture of the acrylic unsaturated polymer with about 0.1 to about 100% by weight, on a commercial scale 1 to 30% by weight, based on the acrylic unsaturated polymer, of an unsaturated monomer can also be used as the unsaturated compound in the present invention.

Examples of the unsaturated monomer include those having a molecular weight of about 100 to about 300 such as, for example, allyl-type monomers such as triallyl cyanurate, tolylene diallyl carbamate or diallyl isocyanurate; acrylic monomers such as N-methylol acrylamide, acrylamide, methacrylamide, N-tertiary butyl acrylamide, diacetone acrylamide, triacryl formal, ethyl acrylate or butyl acrylate; vinyl-type monomers such as vinyl stearate, N-vinyl carbazole, divinylbenzene or divinyl ethylene glycol; maleimide; dimethyl itaconate; and acenaphthylene.

Unsaturated polyester resins are another example of the unsaturated polymer. Preferred unsaturated polyester resins have a molecular weight of about 1,000 to about 50,000 and contain not more than about $10^{19}$ double bonds per gram. The unsaturated polyester resins are unsaturated polymers obtained, for example, by esterifying an acid component composed of at least one unsaturated carboxylic acid such as maleic anhydride or fumaric acid and a saturated polybasic carboxylic acid with a polyhydric alcohol, and are available commercially, for example, under the trade names Nitron V-280, 290, 135, 553, and 580 (free from styrene, products of Nitto Denko K.K.), Yupica GLC-316, ILC-234, and CLS-834 (products of Toyo Boseki K.K), and Rigolack-2260, 2030, and 165 Q (products of Showa Kobunshi K.K) and Epolack P-982Y, G-600p, and G-180 (products of Nippon Shokubai Kagaku Kogyo K.K.).

Unsaturated polymers such as polymer precursors, such as a diallyl phthalate prepolymer, can also be used as the unsaturated compound in the present invention. The precursors used herein are products obtainable by polymerizing to a degree of polymerization of about 2 to about 50 one or more monomers having 2 or more double bonds per molecule, in which at least one double bond (unreacted) remains in the precursor. The molecular weight of the precursors used generally ranges from about 100 to about 5,000.

The unsaturated polyester resin or the polymer precursor (e.g., a diallyl phthalate prepolymer) may be used alone, or as a mixture thereof with about 0.1 to about 100% by weight, on a commercial basis 1 to 30% by weight, based on the weight thereof, of the above-mentioned unsaturated monomer.

The unsaturated monomers containing at least 2 double bonds per molecule can be used alone as the unsaturated compound in the present invention without being mixed with other unsaturated monomers.

Mixtures of the unsaturated polymers with one another can, however, also be used as the unsaturated compound in the present invention.

A composite sheet obtained by using an unsaturated monomer containing only one double bond per molecule as the unsaturated compound only gives an adhesive layer having poor heat stability, and, therefore, in the present invention an unsaturated monomer containing only one double bond per molecule can hardly be used alone. However, as in the composite sheet shown in FIG. 2, for example, in which two layers of unsaturated compounds are present, one of the layers can be prepared from an unsaturated polymer containing at least 2 double bonds per molecule, and the other from an unsaturated monomer containing only one double bond per molecule.

Examples of the initiators suitably used in this invention are those which decompose at relatively low temperatures (e.g., about 60° C to about 150° C) to generate free radicals, such as, for example, (1) peroxide-type free radical initiators such as dialkyl peroxides such as di-tertiary butyl peroxide, tertiary butyl cumyl peroxide or di-cumyl peroxide; diacyl peroxides such as benzoyl peroxide or acetyl peroxide; hydroperoxides such as tertiary butyl hydroperoxide or cumene hydroperoxide; ketone-type peroxides such as methyl ethyl ketone hydroperoxide; peracids such as peroxyacetic acid or peroxybenzoic acid; peroxy carbonate; or peroxy oxalate; (2) azo-type free radical initiators such as azobisisobutyronitrile or azobis-t-butyronitrile and (3) inorganic free radical initiators such as potassium persulfate or ammonium persulfate.

The amount of the initiator per unit area of the composite sheet is, in terms of the number of active free radicals generated from the initiator, usually about 0.1 to about 1,000, preferably 1 to 100, especially preferably 5 to 50, per 1,000 double bonds.

When the number of active radicals is less than about 0.1, the rate of the curing reaction that occurs by hot-pressing the composite sheet tends to become low. When the number is above 1,000, the mechanical strength of the resulting cured layer is likely to become poor, and the adhesive strength also tends to be reduced.

When the unsaturated compound used in this invention is liquid, it sticks to other materials during the storage or use of the composite sheet to render handling troublesome. Furthermore, since it does not have sheet-forming ability, it must be solidified or made highly viscous at room temperature to impart a layer-forming ability thereto. In order to achieve such a result, it is advisable to add a polymer (carrier) which is non-reactive with the unsaturated compound at the time of layer formation or the formation of an adhesive laminate of the layers. Suitable non-reactive carriers include thermoplastic resins or rubbers which generally have a molecular weight of about 5,000 to about 100,000. Examples of such polymer carriers added to the liquid unsaturated compound include a saturated polyester resin, polyvinyl acetate, polyvinyl butyral, polyvinyl acetal, a polyamide, a saturated polyester, ethylene vinyl acetate, an alcohol-soluble nylon, a phenoxy resin or other thermoplastic resins. The use of such a polymer carrier converts a normally liquid unsaturated compound to a normally solid or highly viscous solid solution-like unsaturated compound layer. It is sufficient that the non-reactive polymers illustrated above be non-reactive with the unsaturated compound and the initiator at the time of forming layers or an adhesive laminate of the layers, or upon storing the resulting composite sheets. Preferably, polymeric materials that can be a component of hot-melt adhesives are used as the non-reactive carrier. Hot-melt adhesives comprising a softening agent (e.g., turpentine oil, a petroleum resin, etc.) and an ethylene/vinyl acetate copolymer or a polyamide resin having a molecular weight of about 5,000 to about 100,000 are preferably used in this invention.

Rubbers such as 1,2-polybutadiene, 1,4-polybutadiene, polyisoprene, polychloroprene or a butadiene/acrylonitrile copolymer can also be used as the non-reactive carrier.

Where the unsaturated compound is a powder, it does not have layer-forming ability, and, therefore, the use of such a non-reactive carrier is recommended. It is common that a non-reactive carrier having no double bond in the molecule thereof is employed, but one having a double bond(s) can be employed. In the latter case, the double bonds contained in the molecule of the non-reactive carrier have a remarkably low reactivity so that substantially no double bonds react during the hardening reaction at the time of heat-pressing the composite sheet. Comparing the case of adding a non-reactive carrier with the case of not adding a non-reactive carrier to the same unsaturated compound, in the former case the number of effective double bonds per gram of the materials which form the unsaturated compound layer is lower as compared with the latter case. Thus, when a non-reactive carrier is added to the unsaturated compound, the number of the double bonds should be calculated to account for this "dilution" effect.

A polymer as a non-reactive carrier seldom contains functional groups in the molecule thereof, and if it does the number thereof is very low. These functional groups exhibit low reactivity when mixed with the unsaturated compound or the initiator so that the presence of these functional groups can be overlooked.

Usually, the non-reactive carrier is used in an amount of not more than about 500% by weight, preferably not more than 200% by weight, especially preferably not more than 100% by weight, based on the amount of the unsaturated compound used. If the amount is too large, the rate of curing of the composite sheet is slow, and the bond strength of the cured layer is likely to become poor.

When polyvinylbutyl ether is added as the non-reactive carrier to a powdery unsaturated compound, it has the effect of imparting tackiness and forms a tacky layer. Hence, using this layer, a composite sheet having tackiness at room temperature and heat-curable upon heating can be obtained.

When the initiator is liquid or powder, layer-forming ability can be imparted by adding a non-reactive carrier to the initiator. The amount of the non-reactive carrier is not more than about 2,000% by weight, preferably not more than 1,000% by weight, especially preferably not more than 100% by weight, based on the amount of the initiator. When the initiator is in powder form, plasticizers such as dibutyl phthalate, dioctyl phthalate, dioctyl adipate and the like can be used as a non-reactive carrier.

Since the use of a non-reactive carrier reduces the degree of contact between the unsaturated compound and the initiator at the interface between the layers of these materials, the resulting composite sheet has a longer shelf life. Thus, even when the unsaturated compound or initiator has layer-forming ability itself, a non-reactive carrier may, if desired, be added to form layers thereof.

If desired, a coloring pigment or an anticorrosive filler may be added to the unsaturated compound layer.

Examples of suitable coloring pigments which can be used in this invention include inorganic pigments and organic pigments. Examples of inorganic pigments as are used include (a) natural products (e.g., clay, barite, yellow ochre, etc.) and (b) synthetic products. Examples of synthetic products include (i) chromates (e.g., chrome yellow, barium yellow, etc.); (ii) ferrocyanides (e.g., iron blue, etc.); (iii) sulfides (e.g., cadmium yellow, zinc sulfide, antimony white, etc.); (iv) sulfates (e.g., barium sulfate, zinc sulfate, etc.); and (v) oxides (e.g., zinc oxide, titanium white, etc.). Examples of organic pigments include (a) natural products (e.g., Madder Lake, Logwood Lake, etc.) and (b) synthetic products. Examples of synthetic products include (i) nitroso pigments (e.g., Naphthol Green B, etc.); (ii) nitro pigments (e.g., Naphthol Yellow S, etc.); and (iii) azo pigments (e.g., Permanent red 4R, Hansa Yellow, etc.). Of the above-exemplified pigments, titanium white and azo pigments are preferred for use in this invention. A suitable amount of pigment generally ranges from about 0.1 to about 20% by weight based on the weight of the unsaturated compound.

Examples of suitable anticorrosive fillers which can be used in this invention include phenyl-$\beta$-naphthylamine, hydroquinone monobenzyl ether, etc. A suitable amount of anticorrosive filler generally ranges from about 0.1 to about 5% by weight based on the weight of the unsaturated compound.

Figure 4:
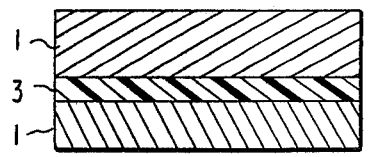

In another embodiment of this invention, a composite sheet can be obtained by supporting a layer of the unsaturated compound or the initiator by a glass paper, a glass fiber non-woven fabric or a woven fabric of glass fibers, a paper sheet, or a fibrous base material such as a non-woven fabric or a woven fabric formed of organic fibers such as polyester or polypropylene fibers. Scrim can also be used as the fibrous base material. An example of such a composite sheet is shown in FIG. 4 in which (3) shows a fibrous base material impregnated with an initiator (an initiator layer), and (1) shows an unsaturated compound layer.

Preferably, the fibrous base material is a non-woven fabric having a fiber denier size of about 1 to about 12 denier, preferably 3 to 6 denier, which contains fine pores with a specific volume of about 1 to about 10 cm$^3$/g, preferably 2 to 5 cm$^3$/g, and a thickness of about 0.02 to about 1.0 mm, preferably 0.04 to 0.5 mm. For example, when a solid initiator is dissolved in an organic solvent such as acetone or ethanol and impregnated into a non-woven fabric and then the solvent is volatilized to adjust the initiator pick-up to about 0.5 to about 100 g/m$^2$, the initiator adheres to the surfaces of fibers that make up the non-woven fabric.

Non-woven fabrics as described above can also be used to carry the unsaturated compound as a layer on a fibrous base material. The unsaturated compound pickup on the non-woven fabric is generally from about 30 g/m$^2$ to about 500 g/m$^2$. Such an element is used in a manner similar to an initiator-impregnated non-woven fabric, and disclosure relative thereto applies with equal force.

When a composite sheet in accordance with this invention is prepared using such an initiator-impregnated non-woven fabric as an initiator layer, the area of contact between an unsaturated compound layer and the initiator layer is reduced, and, therefore, the shelf life of the composite sheet becomes longer.

Figure 5:

Preferred composite sheets in accordance with this invention are those of the types shown in FIGS. 4 and 5 in which the unsaturated compound layer is composed of an acrylic unsaturated polymer alone expressed by the above general formula or a mixture thereof with about 0.1 to about 100% by weight of an unsaturated monomer, and the initiator layer consists of an initiator-impregnated non-woven fabric prepared by impregnating a non-woven fabric of organic fibers with an initiator (especially preferably, benzoyl peroxide) and adjusting the initiator pickup to about 0.5 to about 100 g/m$^2$. Examples of organic fibers used in this invention include polyester fibers, polypropylene fiber, cellulose fiber (regenerated cellulose fiber), etc.

Instead of the fibrous base material, a plastic foam sheet, preferably one having open cells, can also be used. A plastic foam sheet having a foaming ratio of about 10 to about 20 and a thickness of about 0.5 to about 3 mm is most suitably used.

Usually, the unsaturated compound layer or initiator layer in the present invention has a thickness of about 0.01 to about 1 mm.

The composite sheet of this invention can be produced, for example, in the following manner.

An unsaturated compound material containing an unsaturated compound with or without a non-reactive carrier is dissolved in an organic solvent such as toluene or methyl ethyl ketone, and the solution is coated on a strippable sheet (release sheet; removable liner; liner sheet). The organic solvent is volatilized to form a layer of the unsaturated compound material. Separately, an initiator material containing an initiator with or without a non-reactive carrier is dissolved in a solvent such as toluene or methyl ethyl ketone, and the solution is coated on a strippable sheet to form a layer of the initiator material.

The unsaturated compound layer or initiator layer may be prepared by a hot melt extrusion at a temperature of from about 50° to about 150° C (in such a temperature range the viscosity of the unsaturated compound becomes about 10$^3$ to about 10$^6$ poises) without using a solvent, if desired.

Figure 6:
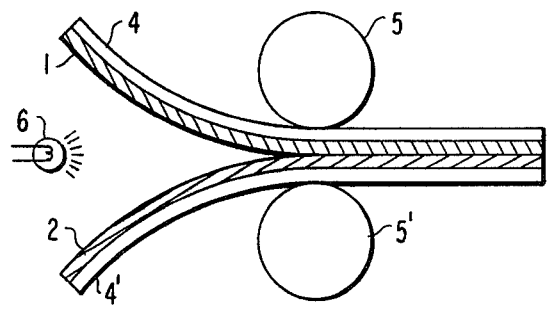
FIG. 6 is a view illustrating an example of producing the composite sheet of this invention.

The resulting unsaturated compound layer and the initiator layer are bonded to each other by passing them between two rolls as shown in FIG. 6. When the materials are tacky at room temperature (.e.g., about 15 to about 25° C), the materials are bonded to each other without heating. In this case, a roll pressure of about 0.5 to about 10 kg/cm$^2$ is employed. When the materials are not tacky, the materials are heated and softened at a temperature such that the initiator does not lose its free radical reaction initiating ability, and then they are bonded to each other. In practice, heating is carried out within about 5 seconds at about 40° to about 70° C. Occasionally, cooling, for example by blowing cool air, is then performed.

In FIG. 6, the reference numeral 1 shows a layer of the unsaturated compound material; 2, a layer of the initiator material; 4,4', strippable sheets; 5,5', rolls; and 6, an infrared lamp. Examples of strippable sheets include glassine paper treated with silicone resin; a polyethylene film treated with silicone resin; a polyester film treated with silicone resin; a polytetrafluroethylene film; a metal sheet, the surface(s) of which have been treated with a silicone resin by a mold releasing method; and the like.

When at least one of the unsaturated compound layer and the initiator layer is tacky at room temperature, they are bonded at room temperature. On a commercial scale, the unsaturated compound layer is rendered tacky and the initiator layer is bonded thereto.

When neither of the unsaturated compound layer or the initiator layer has tackiness at room temperature, heated rolls or infrared ray lamps are used, and the surfaces to be bonded are heated and softened at a temperature at which the initiator layer does not lose its free radical reaction initiating ability, after which they are bonded at the tackifying temperature. Preferably, only the unsaturated compound layer is rendered tacky by heating it at the temperature (e.g., about 40° to about 70° C) at which the initiator does not lose its free radical reaction initiating ability within about 5 seconds at a roll pressure of about 0.5 to about 10 kg/cm$^2$, and then bonded to the initiator layer. Occasionally, cooling, for example by blowing cool air, is then performed.

The resulting composite sheet containing the strippable sheets is stored either as it is or after removing the strippable sheets.

When composite sheets having no tackiness are desired, they can also be produced continuously using strippable sheets in endless belt form.

Another method for producing the composite sheet of this invention comprises heat melt extruding an unsaturated compound layer on a separately prepared initiator layer. Temperatures employed for melt extruding are those such that the viscosity of the unsaturated compound material is about $10^3$ to about $10^6$ poises, and generally range from about 50° to about 150° C.

When an initiator-impregnated sheet prepared by impregnating a fibrous base material with an initiator is used as the initiator layer, the composite sheet can be produced by bonding the unsaturated compound layer, prepared in the above manner, using a roll at the conditions earlier described for bonding the unsaturated compound layer and initiator layer with reference to FIG. 6, or the unsaturated compound layer can be hot melt-extruded onto the initiator-impregnated sheet material at the conditions earlier given for hot melt-extruding the unsaturated compound layer on a separately prepared initiator layer.

Since in the composite sheet of this invention the unsaturated compound layer and the initiator layer make contact merely at their interface and are substantially separated, no curing reaction occurs at room temperature, and the sheet can be stored for more than 6 months at a temperature of not more than 50° C.

When materials are desired to be bonded by using the composite sheet of this invention, it is held between the materials to be bonded, and pressed at a temperature of usually about 100° C, whereupon the unsaturated compound and the initiator, etc., are melted and mixed, and cured in about 5 seconds to about 5 minutes to afford an adhesive layer having superior bond strength. The temperature employed herein is not limitative and generally ranges from about 70° to about 120° C. The pressure employed generally ranges from about 10 g/cm$^2$ to about 10 kg/cm$^2$.

Preferably, the unsaturated compound and the initiator are melted and mixed uniformly. Even if there is non-uniformity in melting, once free radicals are generated in the unsaturated compounds the free radical reaction proceeds successively to provide an adhesive layer having superior bond strength.

When the fibrous base material is present in the composite sheet of this invention, it prevents damage of the composite sheet by external forces during storage, and, after curing by heat, it serves to impart superior mechanical strength to the adhesive layer.

When an initiator-impregnated sheet-like material prepared by impregnating a non-woven fabric with an initiator to a takeup of about 0.5 to about 100 g/m$^2$ is used as the initiator material layer, the area of contact between the unsaturated compound layer and the initiator layer in the resulting composite sheet becomes small, and, therefore, the resulting composite sheet has a shelf life of more than 7 months at 50° C.

The composite sheet of this invention as an adhesive sheet can be used in all fields in which conventional heat-bondable adhesives have been used. For example, in the production of decorative sheets it is used for bonding single sheets to each other or an overlay paper, pattern paper or barrier paper to a base sheet. It can also be used as an adhesive for bonding a honeycomb structure to a sheet material. Furthermore, in the production of furniture such as desks or wardrobes, it can be used as an adhesive for bonding a decorative sheet having, for example, a grain-pattern design, to the main body of such an article. In the production of runner plates for skis, the composite sheet of this invention can be used for bonding a core plate to a sliding surface plate or to a surface plate. It can also be used as an anti-explosive adhesive sheet for a television receiving set to bond a receiving tube to a rim band or to a tension band.

When the composite sheet of this invention is used as a surface layer-forming material, a decorative sheet having good properties can be very easily obtained by merely bonding the composite sheet to the surface of a sheet material such as a wooden sheet, metal sheet or plastic sheet under pressure and heat for a short period of time thereby to form a smooth, tough coated layer bonded firmly to the surface of the sheet material. The temperature employed herein is not limitative, and generally ranges from about 70° to about 120° C. The pressure and time employed range from about 0.1 to about 10 kg/cm$^2$ and from about 5 seconds to about 5 minutes, respectively. Thus, the efficiency of decorative sheet production can be increased. In addition, since processing is very easy, a beautiful surface coating can be provided in homes on furniture, inner and outer walls, etc., without a troublesome coating operation but by merely hot-pressing the composite sheet of this invention on the surface of the furniture or inner or outer walls using an iron, for example. In the production of decorative sheets in factories using the composite sheet of this invention, no scattering of solvent occurs as in the case of using paints. The process is very sanitary and not likely to cause pollution. Furthermore, there is no danger of fire or explosion.

When a composite sheet is prepared using an initiator-impregnated sheet obtained by impregnating an initiator into a fibrous base material having a grain-pattern print or other design and is used as a surface layer-forming material, a decorative sheet with a grain-pattern or other design can be obtained. When a composite sheet is prepared using an initiator-impregnated sheet prepared by impregnating an initiator into a fibrous base material having no such print or design, the resulting coated layer can be rendered transparent by selecting the refractive index of the fibrous base material, such as a non-woven fabric, to correspond to that of the unsaturated compound layer. When such a composite sheet is bonded under heat and pressure on plywood (the conditions earlier given for bonding the composite sheet to the surface of a sheet material such as a wooden sheet or the like are preferably used), a certificate or tax stamp, a photograph or other printed matter, it provides a completely transparent protective sheet. When it is used as an overcoat material for the surface of season tickets or other important documents, it serves to prevent forgery or breakage.

Since the curing conditions for the composite sheet are very mild and curing can be carried out at low temperatures for short periods of time, for example, 1 minute at 130° C or 3 minutes at 100° C, an overcoat layer can be formed without harming the support. Furthermore, because of such mild curing conditions, the overcoating can be done in homes using an iron.

When using a composite sheet of this invention comprising a glass fiber woven fabric or a non-woven glass fabric as the initiator-impregnated fibrous base material, a very tough coated layer, the same as in the case of glass fiber-reinforced plastics, can be formed. When a plurality of such composite sheets are laminated and pressed under heat, a glass fiber-reinforced plastic sheet or a tubular material can be obtained, as desired. The temperature employed herein is not limitative, and generally ranges from about 70° to about 120° C. The pressure and time employed range from about 0.1 to about 10 kg/cm² and from about 5 seconds to about 5 minutes, respectively.

The composite sheet of this invention can be provided as an adhesive layer on the inside surface of a heat-shrinkable tube or on the outer surface of a heat-expandable tube. Various molded articles can be produced by forming the composite sheet into a rod-like or tubular article, or laminating a plurality of such sheets to form a plate-like material which is then pressed under heat, preferably using the conditions as set forth in the preceding paragraph.

The composite sheet of this invention containing a fibrous base material can be wound helically in tape form around a bar of a high voltage conductor or a coil of a rotating machine, and can be used for electric insulation after heat curing, or it can be used as a material for laminated articles. When the composite sheet of this invention is used as an insulating material for conductors or coils, etc., the fibrous base material may be composed of heat shrinkable fibers, such as polyester fibers.

Usually, the heat-shrinkable fibrous base material has a heat shrinking temperature of about 90° to about 150° C.

When a redox catalyst is added to the unsaturated compound material layer, a cured layer can be obtained by heating the resulting composite sheet at a temperature of low as about 80° C for a period of as short as about 1 minute. The amount of the redox reducing catalyst is usually about 10 to about 200% by weight, preferably 50 to 150% by weight, based on the initiator used.

Examples of redox catalysts are amines such as dimethylaniline or triethanolamine, metal carbonyl compounds such as chromium, manganese or nickel carbonyl, acetoacetate esters of metals such as manganese or iron, salts of metals such as cobalt, manganese or copper with naphthenic acid or octenoic acid, chlorides of copper, zinc, or tin such as $ZnCl_2$, $SnCl_2$, or $CuCl$, and organic chlorinated compounds such as chloroform, hydrazine, thiourea, phenylmercaptan, benzenesulfinic acid, p-toluenesulfinic acid, β-thionaphthol and the like.

The following Examples illustrate the present invention more specifically. It should be noted, however, that these Examples do not limit the scope of the invention in any way. All parts and percentages in these Examples are by weight.

In the following Examples, any fibrous base material used was a non-woven fabric of organic fibers having a denier size of 3 to 5, a specific volume of 2 to 5 m³/g and a thickness of 0.4 to 0.05 mm.

EXAMPLE 1

150 parts of an acrylic unsaturated polymer (Polyester Acrylate ND-1, a trademark for a product of Toa Gosei Kagaku K.K.) and 100 parts of a non-reactive carrier (Biron-200, a trademark for a product of Toyo Boseki K.K., which is a linear saturated polyester resin which contains hydroxyl groups or carboxyl groups at both ends of the molecule and has a specific gravity of 1.255 (25° C), a molecular weight of 15,000 to 20,000, a glass transition point of 67° C and a melting point of 180° to 200° C) were dissolved in methyl ethyl ketone to form a 60% solution. The solution was coated on a strippable paper (obtained by treating glassine paper with a silicone resin), and dried at 120° C for 3 minutes to form an unsaturated compound material layer having a thickness of 80 microns. This unsaturated compound material layer was tacky.

Separately, 50 parts of benzoyl peroxide and 100 parts of the above-mentioned polyester resin were dissolved in methyl ethyl ketone to form a 20% solution. The solution was impregnated into a non-woven polyester fabric (Vilene H-81015, a trademark for a product of Nippon Vilene K.K.), and dried at 50° C for 5 minutes to form an initiator material layer with an initiator pickup of 7 g/m² (an initiator-impregnated non-woven fabric).

The initiator material layer was contacted with the unsaturated compound material layer on the strippable paper, and bonded by means of a metal roll and a rubber roll at a pressure of about 1 kg/cm² and at room temperature for about 1 second to form a composite sheet as shown in FIG. 1.

The properties of the resulting composite sheet are shown in Table 1.

EXAMPLE 2

A mixture of 100 parts of an acrylic unsaturated polymer (Ripoxy F-900, a trademark for a product of Showa Kobunshi K.K., an epoxy methacrylic acid oligomer which contains methacrylic groups at both ends of the molecule and which has a specific gravity of 1.075 (25° C) and a viscosity of 4 to 8 poises (25° C)) and 100 parts of polyvinyl butyl ether as a non-reactive carrier (Eslec BM-4, a trademark for a product of Sekisui Kagaku Kogyo K.K., which has a specific gravity of 1.1 (25° C), an average degree of polymerization of 500 to 1,000 and a butyralization degree of 62 ± 3 mol% and in which the amount of the remaining acetyl groups is 4 to 6 mol%) was dissolved in methyl ethyl ketone to prepare a 60% solution.

The solution was coated on the same strippable paper as was used in Example 1, and dried at 120° C for 3 minutes to form an unsaturated compound material layer having a thickness of 50 microns.

On the other hand, a cotton woven fabric (Canvas WS No. 11, a product of Daiwa Boseki K.K.) was immersed in a 10% methyl ethyl ketone solution of cumene hydroperoxide and dried at 60° C for 10 minutes to form an initiator material layer with an initiator pickup of 3 g/m² (an initiator-impregnated woven fabric).

The unsaturated compound material layer with the strippable paper was placed on one surface of the initiator material layer so that the initiator material layer made contact with the unsaturated compound material layer, and they were bonded by means of metal rubber rolls at a pressure of about 1 kg/cm² for a period of time of about 1 second to form a laminate sheet with two layers. The metal roll was heated to 60° C and the unsaturated compound material layer with the strippable paper was placed on the side of the metal roll during the bonding. The rubber roll was not heated.

Figure 2:
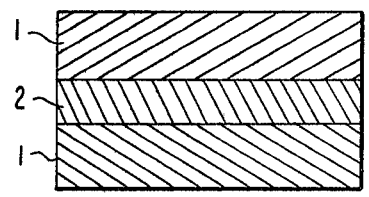

Furthermore, the above unsaturated compound material with the strippable paper was bonded to the initiator layer side of the resulting laminate sheet by means of a metal roll and a rubber roll placed opposite to each other to thereby form a composite sheet as shown in FIG. 2. For this procedure, the laminate sheet was placed on the rubber roll side and the unsaturated compound material layer on the metal roll side. The metal roll was heated to 60° C and the unsaturated compound material layer was placed in contact with the initiator layer side of the laminate sheet at a pressure of about 1 kg/cm$^2$ for a period of time of about 1 second. The rubber roll was not heated. Unless otherwise indicated, in the following examples where a metal roll was used it was heated to 60° C, where a rubber roll was used it was not heated and bonding was at a pressure of about 1 kg/cm for a period of time of about 1 second.

The properties of the resulting composite sheet are shown in Table 1.

EXAMPLE 3

A mixture of 100 parts of an unsaturated polyester resin (Epolac G-600 P, trademark for a product of Nippon Shokubai Kagaku K.K.) and 100 parts of a non-reactive carrier (a saturated polyester resin, Biron-200, the same as was used in Example 1) was dissolved in methyl ethyl ketone to form a 60% solution. The solution was coated on the same strippable sheet as was used in Example 1 and dried at 120° C for 5 minutes to form an unsaturated compound material layer having a thickness of 100 microns.

On the other hand, a mixture of 10 parts of ammonium persulfate and 100 parts of the above-mentioned non-reactive carrier was dissolved in methyl ethyl ketone to form a 60% solution. The solution was coated on the same strippable paper as was used in Example 1 and dried at 50° C for 3 minutes to form an initiator material layer having a thickness of 10 microns.

The initiator material layer with the strippable paper and the unsaturated compound material layer with the strippable paper were placed so that the initiator layer made contact with the unsaturated compound layer and then bonded by a metal roll and a rubber roll placed opposite to each other to thereby form a composite sheet. During the bonding, the metal roll was heated to 60° C and the unsaturated compound material layer with the strippable paper was placed on the metal roll side. The rubber roll was not heated.

The properties of the resulting composite sheet are shown in Table 1.

EXAMPLE 4

A mixture of 100 parts of an acrylic unsaturated compound (NK-Ester 29, trademark for a product of Shin Nakamura Kagaku K.K., which is diethylene glycol dimethacrylate) and 50 parts of a nitrile rubber (Hycar 1072, trademark for a product of Goodrich Company) was dissolved in methyl ethyl ketone to form a 60% solution. The solution was coated on the same strippable paper as was used in Example 1 and dried at 120° C for 5 minutes to form an unsaturated compound material layer having a thickness of 150 microns.

On the other hand, a mixture of 15 parts of di-tertiary butyl peroxide and 100 parts of the above-mentioned nitrile rubber was dissolved in methyl ethyl ketone to form a 60% solution. The solution was coated on the same strippable paper as was used in Example 1 and dried at 50° C for 3 minutes to form an initiator material layer having a thickness of 10 microns.

The initiator material layer with the strippable paper and the unsaturated compound material layer with the strippable paper were placed so that the initiator material layer made contact with the unsaturated compound layer and bonded by a metal roll and a rubber roll to form a laminate sheet. During the bonding operation, the unsaturated compound material layer was placed on the metal roll side, and the metal roll was heated to 60° C.

Figure 3:
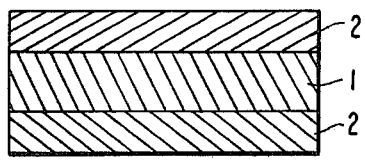

The strippable papers of the resulting laminate sheet were removed to expose the unsaturated compound material layer, and the above-mentioned initiator material layer with the strippable paper was placed on the exposed unsaturated compound layer so that the unsaturated compound material layer made contact with the initiator material layer, and the assembly then bonded by means of a metal roll and a rubber roll placed opposite to each other to thereby form a composite sheet as shown in FIG. 3. At bonding, the unsaturated compound material layer was heated to 60° C by means of an infrared lamp. The rubber roll was not heated. There was no substantial decomposition of consequence of the initiator during this heating step.

The properties of the resulting composite sheet are shown in Table 1.

EXAMPLE 5

A mixture of 100 parts of N-methylol acrylamide and 10 parts of an acrylic unsaturated polymer (Aronix M-6100, trademark for a product of Toa Gosei Kagaku K.K.) was dissolved in methyl ethyl ketone. The solution was coated on a glass cloth (LPC-131 H$_2$, trademark for a product of Arisawa Seisakusho K.K.) and dried at 120° C for 3 minutes to form an unsaturated compound material layer (A) with an unsaturated compound pickup of 100 g/m$^2$.

Separately, a stainless autoclave was charged with 100 parts of a polyester having a molecular weight of 10,000 and containing hydroxyl groups at both ends of the molecule which had been prepared from ethylene glycol and terephthalic acid in a molar ratio of 1.2 : 1, 100 parts of toluene, 100 parts of methacrylic acid and 5 parts of p-toluenesulfonic acid (in which the unreacted glycol was removed by distillation under reduced pressure). The air in the autoclave was replaced by nitrogen, and, with stirring, the system were reacted at 120° C for 8 hours at autogenous pressure to form an unsaturated polymer containing a methacrylic acid group at both ends. The resulting unsaturated polymer was dissolved in methyl ethyl ketone to form a 60% solution. The solution was coated on the same strippable paper as was used in Example 1 and dried at 120° C for 3 minutes to form an unsaturated compound material layer (B) having a thickness of 100 microns.

On the other hand, 50 parts of benzoyl peroxide and 100 parts of a saturated polyester as a non-reactive carrier (Biron-300, trademark for a product of Toyo Boseki K.K. which is a linear saturated polyester resin which contains hydroxyl groups or carboxyl groups at both ends of the molecule and has a specific gravity of 1.192 (25° C), a molecular weight of 20,000 to 25,000, a glass transition point of 6° C and a melting point of 140° to 160° C) were dissolved in methyl ethyl ketone to form a 60% solution. The solution was coated on the same strippable paper as was used in Example 1 and dried at 50° C for 3 minutes to form an initiator material layer having a thickness of 20 microns.

The resulting initiator material layer with the strippable paper and the unsaturated compound material layer (A) were placed so that the initiator material layer made contact with the unsaturated compound layer and bonded by means of a metal roll and a rubber roll to form a laminate sheet. For bonding, the unsaturated compound material layer was placed on the metal roll side and the metal roll was heated at 60° C. Furthermore, in order to prevent the unsaturated compound material from softening and thus adhering to the surface of the metal roll, the same strippable paper as was used above was interposed between the unsaturated compound material and the surface of the metal roll.

The strippable paper on the initiator material layer side of the resulting laminate sheet was then removed to expose the initiator material layer. The unsaturated compound material layer (B) with the strippable paper was placed on the exposed initiator material layer so that the initiator material layer made contact with the unsaturated compound material layer and the assembly bonded by means of a metal roll and a rubber roll to thereby form a composite sheet. For bonding, the metal roll was heated to 60° C and the unsaturated compound material layer (B) with the strippable paper was placed on the metal roll side. The rubber roll was not heated.

The properties of the resulting composite sheet are shown in Table 1.

ketone to form a 60% solution. The solution was coated on the same strippable paper as was used in Example 1 and dried at 50° C for 5 minutes to form an initiator material layer having a thickness of 20 microns.

The unsaturated compound material layer and the initiator material layer were then bonded by means of a metal roll and a rubber roll as in Example 3 except that a strippable paper was placed in contact with the surface of the metal roll. The rubber roll was not heated.

The properties of the resulting composite sheet are shown in Table 1.

EXAMPLE 7

A mixture of 100 parts of an unsaturated polyester resin (Epolac G-180, a trademark for a product of Nippon Shokubai Kagaku Kogyo K.K.) and 10 parts of N-butyl acrylamide was dissolved in methyl ethyl ketone to form a 60% solution. The solution was coated on the same strippable paper as was used in Example 1 and dried at 120° C for 3 minutes to form an unsaturated compound material layer having a thickness of 50 microns.

Separately, a non-woven fabric (Bonlite N, trademark for a product of Kojin K.K.) was immersed in a 10% toluene solution of azobisisobutyronitrile, and dried at 40° C for 5 minutes to form an initiator material layer (initiator-impregnated non-woven fabric) with an initiator pickup of 3 g/m$^2$.

The resulting initiator material layer and the unsaturated compound material layer were bonded as in Example 2 to form a composite sheet as shown in FIG. 2.

The properties of the resulting sheet are shown in Table 1.

TABLE 1

| | | | | 180° Peel bond strength for support X as shown below (kg/20 mm) | | | | | | | | | | |
|---|---|---|---|---|---|---|---|---|---|---|---|---|---|---|
| | Shear bond strength (kg/m$^2$) | | | Stainless steel sheet | | | Phenol resin laminate sheet | | | Plywood veneer sheet | | | Aluminum sheet | | |
| | Immediately after production | After storage | | Immediately after production | After storage | | Immediately after production | After storage | | Immediately after production | After storage | | Immediately after production | After storage | |
| Example | | A | B | | A | B | | A | B | | A | B | | A | B |
| 1 | 105 | 98 | 94 | 2.1 | 1.8 | 1.6 | 2.3 | 2.1 | 1.9 | 2.4 | 2.1 | 1.9 | 1.9 | 1.6 | 1.3 |
| 2 | 125 | 119 | 108 | 2.6 | 2.3 | 2.1 | 2.5 | 2.3 | 2.0 | 2.6 | 2.4 | 2.1 | 2.3 | 2.1 | 1.9 |
| 3 | 87 | 85 | 78 | 1.2 | 1.0 | 0.8 | 1.3 | 1.0 | 0.8 | 1.9 | 1.6 | 1.3 | 1.8 | 1.5 | 1.3 |
| 4 | 89 | 85 | 80 | 1.3 | 1.2 | 0.9 | 1.4 | 1.1 | 0.9 | 1.6 | 1.3 | 1.1 | 1.8 | 1.6 | 1.3 |
| 5 | 115 | 110 | 108 | 2.0 | 1.8 | 1.5 | 1.8 | 1.7 | 1.5 | 2.3 | 2.0 | 1.8 | 2.2 | 2.0 | 1.8 |
| 6 | 88 | 85 | 81 | 1.2 | 1.0 | 0.8 | 1.1 | 1.0 | 0.8 | 1.4 | 1.1 | 0.9 | 1.3 | 1.1 | 0.8 |
| 7 | 120 | 110 | 100 | 2.4 | 2.1 | 1.9 | 2.3 | 2.1 | 1.8 | 2.5 | 2.3 | 2.0 | 1.8 | 1.7 | 1.3 |

EXAMPLE 6

A mixture of 150 parts of an acrylic unsaturated polymer (Ripoxy R-840, a trademark for a product of Showa Kobunshi K.K. which is an acrylic oligomer with a viscosity of 20 to 30 poises (25° C) and a specific gravity of 1.107 (25° C), in which the main chain in the molecule is epoxy) and 50 parts of polychloroprene (Neoprene-AJ, trademark for a product of E. I. du Pont de Nemours & Co.) was dissolved in methyl ethyl ketone to form a 60% solution. The solution was impregnated into a glass cloth (Microglass cloth EH-1001, trademark for a product of Nippon Garasu Seni K.K.) and dried at 120° C for 3 minutes to form an unsaturated compound material layer with an unsaturated compound pickup of 120 g/m$^2$.

Separately, a mixture of 10 parts of tertiary butyl peroxybenzoate and 100 parts of a saturated polyester resin as a non-reactive carrier (Biron-300, the same as was used in Example 5) was dissolved in methyl ethyl In Table 1, column A under the heading "After storage" shows the properties of the composite sheets after storage for one year at room temperature, whereas column B shows the properties of the composite sheets after storage for 6 months at 40° C.

The shear bond strength in Table 1 was measured in the following manner. The composite sheet was cut to a size of 10 mm long and 10 mm wide. The sample obtained was interposed between aluminum plates preheated to 100° C and pressed at a pressure of 4 kg/cm$^2$ for 1 minute, and then allowed to stand for 24 hours in an atmosphere kept at 20° C and a relative humidity of 65%. The shear bond strength was measured by a Tensilon tensile tester (Model UTM-3, a product of Toyo Sokki K.K.) at a pulling speed of 10 mm/min, a temperature of 20° C, and a relative humidity of 65%.

Figure 7:
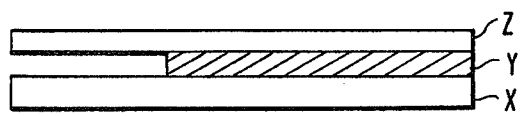
FIG. 7 is a view illustrating the method of measuring the 180° peel bond strength of the composite sheet.

The 180° peel bond strength of the composite sheet was measured in the following manner. A sample composite sheet Y (100 mm long and 20 mm wide) and a canvas Z having a thickness of 150 microns were bonded to support X as shown in Table 1 which had been preheated to 100° C (as shown in FIG. 7) and pressed at 1 kg/cm² for 1 minute. The laminate was then allowed to stand for 24 hours in an atmosphere held at a temperature of 20° C and a relative humidity of 65%, and then its peel strength measured using the same tensile tester as above at a pulling speed of 300 mm/min, a temperature of 20° C and a relative humidity of 65%.

As the support X, a stainless steel sheet, a phenol resin laminate sheet, a plywood veneer sheet and an aluminum sheet as set forth in Table 1 were used.

EXAMPLE 8

150 g of an acrylic unsaturated polymer (Aronix M-6100, polyester acrylate made by Toa Gosei Kagaku K.K.) and 100 g of a non-reactive carrier (Biron-300, the same as was used in Example 5) were dissolved in 200 g of methyl ethyl ketone by stirring. The resultant solution was coated on a strippable paper (prepared by treating glassine paper with a silicone resin) and dried at 130° C for 3 minutes to form an unsaturated compound material layer having a thickness of 70 microns.

Separately, 10 g of benzoyl peroxide was dissolved in 200 g of toluene, and the solution was impregnated into a pulp decorative paper (150 microns thich) having a wood grain pattern thereon, and allowed to dry in air to form an initiator material layer (initiator-impregnated sheet) with an initiator pickup of 5 g/m².

The unsaturated compound material layer was laminated to both surfaces of the initiator-impregnated sheet using a hot metal roll whose surface temperature was maintained at 60° C to form a composite sheet. In more detail, two sheets of the unsaturated compound material layer were laminated to both surfaces of the initiator layer in a "sandwich" shape. In this laminating, the roll pressure was 1 kg/cm² and the period of pressing was about 1 second.

The resultant sheet had good flexibility at a temperature of 10° C or more, and when stored in the dark at 50° C at a relative humidity of 60 to 70%, it retained its initial properties even after 7 months.

After storage for 4 months at a relative humidity of 60 to 70%, the strippable paper was removed from the composite sheet, the composite sheet superimposed on a plywood veneer sheet and the assembly hot-pressed at a pressure of 5 kg/m² and a temperature of 130° C for 3 minutes using a hot press. In spite of the fact that the hot-press conditions were mild, the coating of the resulting decorative sheet was not found to be deteriorated in any manner even after 1 hour in boiling water when evaluated in accordance with JIS K 6902. The resulting decorative sheet also withstood the impact of a steel ball (28 g) which dropped onto it from a height of 500 mm, and thus exhibited superior impact resistance. The pencil hardness thereof (determined by JIS K 5400) was 3H. The shear bond strength between the coating (i.e., the cured composite sheet) and the plywood veneer sheet was 150 kg/cm² at room temperature, which represents a firm bonding sufficient for decorative sheets.

The shear bond strength was measured in the following manner. The composite sheet was cut to a size of 10 mm long and 10 mm wide. The sample sheet was held between plywood veneer sheets and hot-pressed for 3 minutes at a pressure of 5 kg/cm² and a temperature of 130° C, and then allowed to stand for 24 hours in an atmosphere held at a temperature of 20° C and a relative humidity of 65%. The shear bond strength of the sample was then measured by means of a Tensilon tensile tester (Model UTM-3, a product of Toyo Sokki K.K.) at a pulling speed of 10 mm/min, a temperature of 20° C and a relative humidity of 65%.

EXAMPLE 9

The same methyl ethyl ketone solution of the acrylic unsaturated polymer and the non-reactive carrier as was used in Example 8 was coated on a polyester film (S-50, a product of Toray Industries Ltd.) and dried at 130° C for 3 minutes to form an unsaturated compound material layer having a thickness of 70 microns. The resulting unsaturated compound material layer was laminated to both surfaces of an initiator-impregnated sheet (tertiary butyl hydroperoxide was used as the initiator) prepared in the same way as in Example 8 under the same conditions as in Example 8 to form a composite sheet.

The composite sheet was stored for 6 months at a relative humidity of 60 to 70% at room temperature, and then, while one of the polyester films was still attached (namely, either of the polyester films was removed), it was laminated to a plywood veneer sheet using a series of hot metal rolls (10 rolls arranged in a continuous manner) whose surface temperature was maintained at 110° C to form a decorative sheet.

When a polyester film having a smooth surface was used as the strippable paper in this manner, good surface luster was obtained in the resulting decorative sheet merely by removing the strippable paper after hot-pressing. Hence, a surface luster imparting operation can be avoided.

After hot pressing, the coating had a pencil hardness (JIS K 5400) of 3H, and cigarette heat resistance (JIS K 6903). It did not deform or fade in boiling water (JIS K 6902), and, thus, the resulting coating was superior as a decorative sheet.

EXAMPLE 10

263 g of a 57% solution of an acrylic unsaturated polymer in styrene (Ripoxy R-802, trademark for epoxy acrylate made by Showa Kobunshi K.K.) (solids content 150 g), 200 g of a 50% methyl ethyl ketone solution of a non-reactive carrier (Biron-300, the same as was used in Example 5) and 30 g of an unsaturated monomer (triallyl isocyanurate) were mixed with stirring. The mixed solution was coated on a strippable paper, and treated in the same way as in Example 8 to form an unsaturated compound material layer having a thickness of 70 microns.

An unsaturated compound material layer was prepared in the same way as above except that diallyl phthalate (DAP, trademark for a product of Osaka Soda K.K.) or trimethylol propane trimethacrylate (TMPT, trademark for a product of Shin Nakamura Kagaku Kogyo K.K.) was used as an unsaturated monomer instead of the triallyl isocyanurate.

The unsaturated compound material layer was then laminated to the same initiator-impregnated sheet as in Example 8 under the conditions used in Example 8 to form a composite sheet.

When the resulting composite sheets were allowed to stand at 20° C at a relative humidity of 60 to 70% for one year, their curing properties were not changed.

Samples of identical composite sheets were stored for 8 months at 20° C at a relative humidity of 60 to 70%, and then superimposed on a degreased aluminum plate and hot-pressed for 1 minute at a pressure of 5 kg/cm² and a temperature of 130° C to form an aluminum decorative sheet.

By adding unsaturated monomers, the resulting decorative sheets had a better heat resistance and hardness than those obtained without using the unsaturated monomers. For example, as a result of adding DAP, the resulting decorative sheet showed an increase of 2H in pencil hardness and a 20° C increase in its heat distortion temperature. Accordingly, by choosing the unsaturated monomer to be added, a decorative sheet having properties suitable for various uses can be produced.

The properties of the cured coatings of the resulting composite sheets are shown in Table 2 below.

TABLE 2

| | Properties of the composite sheet | | | |
|---|---|---|---|---|
| Unsaturated monomer added | Surface hardness) (pencil hardness | Heat distortion temperature (° C) | Shear bond strength (kg/cm²) | Resistance to boiling water |
| Triallyl isocyanurate | 3H – 4H | 130 | 150 | Good |
| DAP | 5H | 120 | 180 | Good |
| TMPT | 4H | 130 | 180 | Good |
| Not added | 3H | 100 | 160 | Good |

In Table 2, the pencil hardness was determined by JIS K 5400, the heat distortion temperature by JIS K 6911, and the resistance to boiling water by JIS K 6902.

The aluminum decorative sheet was used as a sample in determining its surface hardness and resistance to boiling water. The sample used for determining the heat distortion temperature was prepared by interposing the composite sheet between polytetrafluoroethylene sheets and hot-pressing them for 1 minute at a pressure of 5 kg/cm² and a temperature of 130° C. The sample used for determining the shear bond strength was prepared by placing the composite sheet between aluminum sheets and hot-pressing them for 1 minute at a pressure of 5 kg/cm² and a temperature of 130° C. The method for determining the shear bond strength was the same as in Example 8.

EXAMPLE 11

A four-necked flask equipped with a thermometer, a nitrogen-introducing tube, a condenser, a dropping funnel and a stirrer was charged with 100 parts of liquid 1,2-polybutadiene (NISSO-PB-B), 600 parts of benzene, 100 parts of chloroform and 0.5 part of benzoyl peroxide. At room temperature, the inside of the flask was thoroughly purged with nitrogen, and then 200 parts of methyl methacrylate monomer was dropwise added over the course of 2 hours to effect reaction at 80° C. After the addition, the reaction mixture was aged by holding at the same temperature (80° C) for an additional 4 to 5 hours to provide a polymer having an average molecular weight of 20,000 and a methyl methacrylate content of 40%.

Since this polymer has good compatibility with an acrylic unsaturated polymer, it can be used as a non-reactive carrier for a solid acrylic unsaturated polymer having no layer-forming ability.

100 g of the resulting non-reactive carrier, 50 g of an acrylic unsaturated polymer (Ripoxy H-600, epoxy acrylate made by Showa Kobunshi K.K.) and 25 g of an anticorrosive pigment (zinc powder) were mixed and treated in the same way as in Example 8 to form an unsaturated compound material layer.

On the other hand, a non-woven polyester fabric (H-81015, a product of Nippon Vilene K.K.) was impregnated with benzoyl peroxide in the same way as in Example 8 to form an initiator-impregnated non-woven fabric with an initiator pickup of 4 g/m² (initiator material layer). The unsaturated compound material layer was laminated to both surfaces of the initiator-impregnated non-woven fabric under the same conditions as in Example 8 to form a composite sheet.

The resulting anticorrosive composite sheet was stored for 5 months at room temperature at a relative humidity of 60 to 70%, and then interposed between an iron plate and canvas. The assembly was hot-pressed for 5 minutes at a pressure of 0.2 kg/cm² and a temperature of 130° C to bond the iron plate to the canvas. The peel strength of the canvas was then measured as follows: a test sample having a size of 100 mm (longitudinal length) × 20 mm (width) was used (while the press-bonding conditions differed from those used in Example 1, the measuring conditions and standing conditions after press-bonding were the same as in Example 1, respectively). It was found that at a peel strength of 4 to 5 kg/20 mm, peeling occurred on the interface between the canvas and the cured composite sheet, but no peeling occurred at the interface between the cured composite sheet layer and the iron plate.

On the other hand, an identical sample of the composite sheet obtained was interposed between polytetrafluoroethylene sheets and hot pressed at 150° C for 2 minutes at a pressure of 1 kg/cm² to form a cured coating. The coating had a tensile strength of 170 kg/mm (according to ASTM D 1000) and an elongation of 7.5% (according to ASTM D 1000). It did not change even when allowed to stand for one day in boiling water, and had good resistance to gasoline, salt water, sulfuric acid, alkali and toluene (according to JIS K 6761).

EXAMPLE 12

100 parts of solid 1,2-polybutadiene (JSR-820, a product of Nihon Gosei Gomu K.K.), 600 parts of benzene, 100 parts of chloroform, 200 parts of methyl methacrylate and 0.5 part of benzoyl peroxide were reacted in the same way as in Example 11 to provide a transparent polymer having an average molecular weight of about 40,000. The polymer was used as a non-reactive carrier. 100 g of the non-reactive carrier was mixed with 50 g of an acrylic unsaturated polymer (Aronix M-5700, polyester acrylate made by Toa Gosei Kagaku K.K.) and processed as in Example 8 to form an unsaturated compound material layer.

The resulting unsaturated compound material layer was laminated to both surfaces of the initiator-impregnated non-woven fabric obtained in Example 11 under the same conditions as in Example 8 to form a composite sheet useful for coating.

The composite sheet was heat-bonded to an iron plate. The composite sheet (cured coating) on the iron plate had a pencil hardness of 2H and did not change when left to stand for one day in boiling water. It also had good resistance to gasoline.

A cured coating of the composite sheet was prepared in the same way as in Example 11, and its tensile strength and elongation were measured as in Example 11. It was found to have a tensile strength of 130 kg/mm and an elongation of 15%.

Further, since this composite sheet can yield a completely transparent cured film upon hot-melting, it can be over-coated on the surface of a certificate or tax stamp, e.g., as is found on the top of a pack of cigarettes, using a pair of contiguous heat rolls having a surface temperature of 130° C to thereby advantageously give a certificate stamp or tax stamp which cannot be altered without detection.

EXAMPLE 13

An unsaturated compound material layer having a thickness of 70 microns was prepared by processing 150 g of an acrylic unsaturated polymer (Aronix M-8030, polyester acrylate made by Toa Gosei Kasgaku Kogyo K.K.) and 100 g of the same non-reactive carrier as was used in Example 8 in the same manner as in Example 8.

On the other hand, an initiator material layer (an initiator-impegnated woven fabric) with an initiator pickup of 2 g/m$^2$ was prepared by impregnating a glass fiber woven fabric (HG-250, a trademark for a product of Asahi Fiberglass K.K.) with tertiary butyl peroxybenzoate under the same conditions as in Example 8.

The unsaturated compound material layer was laminated to both surfaces of the initiator-impregnated woven fabric under the same conditions as in Example 8 to form a composite sheet.

When the composite sheet was cured at 150° C for 2 minutes at a roll pressure of 0.2 kg/cm$^2$, its tensile strength and other properties were very good. Thus, it was useful for anticorrosive treatment of pipes and reinforcement and protection of sheet-like materials, as a new thermosetting anticorrosive sheet (conventional anticorrosive sheets are either tacky or of the hot-melt type), a glass fiber-reinforced sheet or as a protective material in general.

The cured composite sheet had a tensile strength of 310 kg/25 mm, an impact strength of 30 kg/cm$^2$ (Charpy impact value in accordance with JIS K-6911), a heat distortion temperature of 125° C, a pencil hardness on an aluminum plate of 2H, a boiling water resistance of more than 1 day, and a gasoline and toluene resistance of more than 1 day at room temperature.

EXAMPLE 14

175 g of a 57% solution (solids content 100 g) of an acrylic unsaturated polymer in styrene (Ripoxy R-802, epoxy acrylate made by Showa Kobunshi K.K.) was mixed with 10 g of an isocyanate prepolymer (C-4095, trademark for a product of Nippon Polyurethane Kogyo K.K.) and 1 g of tin octenoate, and with stirring at 100° C, the mixture was heated for 30 minutes to form an isocyanate-cross linked polymer. 150 g of an acrylic unsaturated polymer (Ripoxy R-802, epoxy acrylate made by Showa Kobunshi K.K.) was added to the resulting polymer, and they were mixed with stirring. The resultant mixture was coated on the same strippable paper as was used in Example 8 and processed in the same way as in Example 8 to form an unsaturated compound material layer having a thickness of 150 microns.

On the other hand, a glass cloth (EWR-33, a trademark for a product of Nippon Garasu Seni K.K.) was impregnated with 200 g of a 10% toluene solution of cumene hydroperoxide as a free radical initiator (Percumyl, a trademark for a product of Nihon Yushi K.K.), and dried to form an initiator material layer (an initiator-impregnated cloth) with an initiator pickup of 20 g/m$^2$.

The unsaturated compound material layer was laminated to both surfaces of the initiator-impregnated cloth in the same way as in Example 8 to form a composite sheet.

The composite sheet was cured by heating at 130° C for 30 seconds, and the properties of the cured coating were measured.

The cured coating had a tensile strength of 2300 kg/cm$^2$, a heat distortion temperature of 130° C, and a pencil hardness on an aluminum plate of 4H. Its resistances to salt water, sulfuric acid, sodium hydroxide, methanol, toluene and kerosene were all good.

EXAMPLE 15

100 parts of an acrylic unsaturated polymer (Polyester Acrylate ND-1, a trademark for a product of Toa Gosei Kagaku K.K.), 2 parts of N,N-dimethylaniline (a catalyst) and 100 parts of a non-reactive carrier (Biron-200, the same as was used in Example 1) were dissolved in methyl ethyl ketone to form a 50% solution.

The solution was coated on a strippable paper the same as was used in Example 8, and dried at 120° C for 3 minutes to form an unsaturated compound material layer having a thickness of 80 microns. This unsaturated compound material layer was tacky.

Separately, 50 parts of the same non-reactive carrier as above and 10 parts of benzoyl peroxide were dissolved in methyl ethyl ketone to form a 50% solution. A non-woven polyester fabric (Vilene H-81015, a trademark for a product of Nippon Vilene K.K., thickness: 40 microns) was impregnated with the resulting solution, and dried at 50° C for 3 minutes to form an initiator material layer with an initiator pickup of 30 g/m$^2$ (an initiator-impregnated non-woven fabric).

The unsaturated compound material layer with the strippable paper was press-bonded at a pressure of about 1 kg/cm$^2$ onto both surfaces of the initiator material layer at room temperature using two metal rolls which faced each other to form a composite sheet as shown in FIG. 4.

The thus obtained composite sheet was allowed to stand at room temperature for 2 days at a relative humidity of 60 to 70% and then cut to a size of 10 mm long and 10 mm wide. The sample obtained was interposed between aluminum plates preheated to 100° C and at a pressure of 4 kg/cm$^2$ for 4 seconds, and then allowed to stand for 24 hours in an atmosphere kept at 20° C and a relative humidity of 65%. Its shear bond strength was then measured by a Tensilon tensile tester (Model UTM-3, a product of Toyo Sokki K.K.) at a pulling speed of 10 mm/min and at a temperature of 20° C, and found to be 103 kg/cm$^2$.

The 180° peel bond strength of the composite sheet was found to be 2.4 kg/20 mm.

The 180° peel bond strength was measured in the following manner. A sample composite sheet Y (100 mm long and 20 mm wide) and a canvas Z having a thickness of 150 microns were bonded to a stainless steel plate X preheated to 100° C, as shown in FIG. 7, and pressed at 1 kg/cm$^2$ for 10 seconds. The laminate was allowed to stand for 24 hours in an atmosphere held at a temperature of 20° C and a relative humidity of 65%, and then its peel bond strength was measured by the same Tensilon tensile tester as mentioned above at a peeling speed of 300 mm/min and at a temperature of 20° C.

The 180° peel bond strengths using a phenol resin sheet, a plywood sheet and an aluminum sheet instead of the stainless steel plate were 2.0, 2.2 and 2.1, kg/20 mm, respectively.

The composite sheet obtained in this Example was stored at a relative humidity of 60 to 70% for 3 months at room temperature, and then its shear bond strength and 180° peel bond strength were measured in the same manner as described above, and confirmed to be substantially the same.

EXAMPLE 16

A mixture of 100 parts of an acrylic unsaturated polymer (Ripoxy F-900, a trademark for a product of Showa Kobunshi K.K.), 1 part of cobalt naphthenate (a catalyst) and 100 parts of a non-reactive carrier (Eslec BLS, a trademark for a butyral resin produced by Sekisui Kagaku Kogyo K.K., degree of butyralization: 70–72%) was dissolved in methyl ethyl ketone to form a 50% solution.

The solution was coated on a strippable paper the same as was used in Example 8, and dried at 100° C for 3 minutes to form an unsaturated compound material layer having a thickness of 100 microns. This unsaturated compound material layer was tacky.

Separately, 100 parts of the butyral resin (non-reactive carrier) as was used above and 50 parts of cumene hydroperoxide were dissolved in methyl ethyl ketone to form a 20% solution. The solution was impregnated into a non-woven polyester fabric (Vilene H-81015, a trademark for a product of Nippon Vilene K.K., a thickness: 40 microns), and dried at 40° C for 3 minutes to form an initiator material layer with an initiator pickup of 50 g/m² (an initiator-impregnated non-woven fabric).

The unsaturated compound material layer with the strippable paper was bonded at a pressure of about 1 kg/cm² onto both surfaces of the initiator material layer at room temperature for about 1 second using two metal rolls which faced each other to form a composite sheet.

The shear bond strength and the 180° peel bond strengths of the thus obtained composite sheet were measured in the same manner as was used in Example 15.

The shear bond strength was 120 kg/cm², and the 180° peel bond strengths to the stainless steel sheet, phenol resin sheet, aluminum sheet and plywood sheet were 2.5, 2.2, 2.3 and 2.4, kg/20 mm, respectively.

The composite sheet obtained in this Example was stored for 3 months at room temperature at a relative humidity of 60 to 70%, and then its shear bond strength and 180° peel bond strengths were measured in the same manner as described above, and confirmed to be substantially the same.

While the invention has been described in detail and with reference to specific embodiments thereof, it will be apparent to one skilled in the art that various changes and modifications can be made therein without departing from the spirit and scope thereof.

What is claimed is:

1. A heat-curable composite sheet comprising a first layer comprising at least one unsaturated compound which is free radical reactive selected from the group consisting of
   i. an unsaturated polymer containing at least two double bonds per molecule;
   ii. a mixture of an unsaturated polymer containing at least two double bonds per molecule and an unsaturated monomer; or
   iii. a mixture of an unsaturated polymer containing at least two double bonds per molecule and an unsaturated polymer containing one double bond per molecule, and a second layer comprising a solid or liquid free radical initiator, said layers being bonded to each other in a laminate as separate layers at a temperature at which the free radical initiator does not lose its free radical initiating capability, wherein said sheet is capable of being cured by the melting and mixing together of the first and second layers at a temperature at which a free radical reaction takes place in said composite sheet.

2. The composite sheet of claim 1, wherein the unsaturated compound is said mixture (iii) and the amount of double bonds in the unsaturated compound is about $10^{19}$ to about $10^{21}$ per gram, and the proportion of the double bonds in the polymer containing at least two double bonds per molecule is at least 0.1% based on the total double bond content.

3. The composite sheet of claim 2, wherein the proportion of double bonds in the polymer containing at least two double bonds per molecule is at least about 1.0% based on the total double bond content.

4. The composite sheet of claim 2, wherein the proportion of double bonds in the polymer containing at least two double bonds per molecule is at least 10% but less than 100% based on the total double bond content.

5. The composite sheet of claim 1, wherein the unsaturated polymer containing at least two double bonds per molecule is an acrylic unsaturated polymer of the formula:

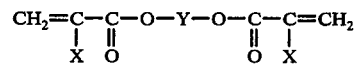

wherein X is a hydrogen atom or a methyl group, and Y is a residue of a member selected from the group consisting of polyesters, polyurethanes, epoxy compounds and polyglycols, which has a molecular weight of not more than about 5,000.

6. The composite sheet of claim 5, wherein the unsaturated compound comprises the acrylic unsaturated polymer and about 0.1 to about 100% by weight, based on he polymer, of an unsaturated monomer.

7. The composite sheet of claim 1, wherein the amount of the initiator, in terms of the number of active free radicals generated from the initiator, is about 0.1 to about 1,000 per 1,000 double bonds of the unsaturated compound per unit area of the composite sheet.

8. The composite sheet of claim 1, wherein the amount of the initiator, in terms of the number of active free radicals generated from the initiator, is 1 to 100 per 1,000 double bonds of the unsaturated compound per unit area of the composite sheet.

9. The composite sheet of claim 1, wherein the amount of the initiator, in terms of the number of active free radicals generated from the initiator, is 5 to 50 per 1,000 double bonds of the unsaturated compound per unit area of the composite sheet.

10. The composite sheet of claim 1, wherein the first layer further comprises a non-reactive carrier.

11. The composite sheet of claim 10, wherein the amount of the non-reactive carrier is not more than about 500% by weight of the unsaturated compound.

12. The composite sheet of claim 10, wherein the amount of the non-reactive carrier is not more than 200% by weight of the unsaturated compound.

13. The composite sheet of claim 10, wherein the amount of the non-reactive carrier is not more than 100% by weight based on the unsaturated compound.

14. The composite sheet of claim 10, wherein the non-reactive carrier is a hot-melt adhesive.

15. The composite sheet of claim 1, wherein the second layer further comprises a non-reactive carrier.

16. The composite sheet of claim 15, wherein the amount of the non-reactive carrier is not more than about 2,000% by weight based on the initiator.

17. The composite sheet of claim 15, wherein the amount of the non-reactive carrier is not more than 1,000% by weight based on the initiator.

18. The composite sheet of claim 15, wherein the amount of the non-reactive carrier is not more than 100% by weight based on the initiator.

19. The composite sheet of claim 1, wherein the second layer is supported by a fibrous base material or a plastic foam sheet.

20. The composite sheet of claim 19, wherein the fibrous base material is a non-woven fabric.

21. The composite sheet of claim 19, wherein the fibrous base material is a non-woven fabric of organic fibers having a denier size of about 1 to about 12 denier, a specific volume of about 1 to about 10 cm$^3$/g, and a thickness of about 0.02 to about 1.0 mm.

22. The composite sheet of claim 21, wherein the fibrous material has a denier size of 3 to 5, a specific volume of 2 to 5 m$^3$/g and a thickness of 0.04 to 0.05 mm.

23. The composite sheet of claim 20, wherein the amount of the initiator applied to the fibrous base material is about 0.5 to about 100 g/m$^2$.

24. The composite sheet of claim 1, wherein the first layer is supported by a fibrous base material or a plastic foam sheet.

25. The composite sheet of claim 19, wherein the fibrous base material or plastic foam sheet is colored.

26. The composite sheet of claim 19, wherein the fibrous base material or plastic foam sheet has a color design printed thereon.

27. The composite sheet of claim 19, wherein the fibrous base material is heat-shrinkable.

28. The composite sheet of claim 1, wherein the initiator is a peroxide radical initiator, an azo radical initiator or an inorganic radical initiator.

29. The composite sheet of claim 28, wherein the initiator is a peroxide radical initiator and is selected from the group consisting of a peroxide, a peracid or a peroxy ester.

30. The composite sheet of claim 1, wherein the initiator is benzoyl peroxide.

31. The composite sheet of claim 1, wherein the first layer is bonded and laminated to both surfaces of the second layer.

32. The composite sheet of claim 1, wherein the unsaturated compound layer and the initiator layer both have a thickness of about 0.01 to about 1.0 mm.

33. The composite sheet of claim 5, which comprises: a substrate comprising a non-woven sheet of organic fibers impregnated with benzoyl peroxide and a non-reactive carrier having on both faces thereof a layer comprising said acrylic unsaturated polymer and a non-reactive carrier.

34. The composite sheet of claim 1, wherein said melting and mixing together is accomplished by heating at a temperature of about 70 to about 120° C and pressing at a pressure of about 10g/cm$^2$ to about 10 kg/cm$^2$.

35. The composite sheet of claim 1, wherein no curing of said sheet occurs at room temperature and said sheet storable for more than six months at a temperature of not more than 50° C with the retention of its curing capability.

36. The composite sheet of claim 1, wherein said unsaturated polymer containing at least two double bonds per molecule is selected from the group consisting of a. an acrylic unsaturated polymer of the formula $$CH_2=\underset{\underset{X}{|}}{C}-\underset{\underset{O}{\|}}{C}-O-Y-O-\underset{\underset{O}{\|}}{C}-\underset{\underset{X}{|}}{C}=CH_2$$

wherein X is a hydrogen atom or a methyl group, and Y is a residue of a member selected from the group consisting of polyesters, polyurethanes, epoxy compounds and polyglycols, which has a molecular weight of not more than about 5,000;

b. an unsaturated polyester resin having a molecular weight of about 1,000 to about 50,000; or c. an unsaturated polymer precursor having a molecular having a molecular weight of about 100 to about 5000.

37. The composite sheet of claim 1, wherein said unsaturated monomer in mixture (ii) is selected from the group consisting of triallyl cyanurate, tolylene diallyl carbamate diallyl isocyanurate;

N-methylol acrylamide, acrylamide, methylacrylamide, N-tertiary butyl acrylamide, diacetone acrylamide, triacryl formal, ethyl acrylate, butyl acrylate, vinyl stearate, N-vinyl carbazole, divinylbenzene, divinyl ethylene glycol, maleimide, dimethyl itaconate, acenaphthylene, diallyl phthlate or trimethylol propane trimethacrylate.

38. The composite sheet of claim 36, wherein said polymer precursor is a diallyl phthalate prepolymer.

39. The composite sheet of claim 1, wherein said unsaturated compound is mixture (ii) and the amount of unsaturated monomer in the mixture is about 0.1 to about 100% by weight based on the polymer.

40. The composite sheet of claim 39, wherein said amount is about 1 to about 30% by weight.

41. The composite sheet of claim 36, wherein said unsaturated polyester resin (b) is synthesized by esterifying an acid component composed of at least one unsaturated carboxylic acid and a saturated polybasic carboxylic acid with a polyhydric alcohol and wherein said unsaturated polymer precursor (c) is synthesized by polymerizing, to an about 2 to about 50 degrees of polymerization, one or more monomers having two or more double bonds per molecule in which at least one double bond per molecule remains in the precursor.

42. The composite sheet of claim 10, wherein said non-reactive carrier is a thermoplastic resin or a rubber.

43. A process for producing a heat-curable multilayer composite sheet, which comprises heat softening a first layer comprising at least one unsaturated compound which is free radical reactive selected from the group consisting of i. an unsaturated polymer containing at least two double bonds per molecule;

ii. a mixture of an unsaturated polymer containing at least two double bonds per molecule and an unsaturated monomer; or iii. a mixture of an unsaturated polymer containing at least two double bonds per molecule and an unsaturated polymer containing one double bond per molecule, and a second layer comprising a solid or liquid free radical initiator at a temperature at which the free radical initiator does not lose its free radical reaction initiating ability, to thereby render said first layer tacky followed by bonding the first and second layers to each other, wherein said composite sheet is capable of being cured by the melting and mixing together of the first and second layers.

44. The process of claim 43, wherein said temperature at which the free radical initiator layer does not lose its free radical reaction initiating ability is from about 40° to about 70° C.

45. The process of claim 43, wherein said unsaturated polymer containing at least two double bonds per molecule is selected from the group consisting of a. an acryclic unsaturated polymer of the formula

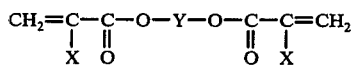

wherein X is a hydrogen atom or a methyl group, and Y is a residue of a member selected from the group consisting of polyesters, polyurethanes, epoxy compounds and polyglycols, which has a molecular weight of not more than about 5,000;

b. an unsaturated polyester resin having a molecular weight of about 1,000 to about 50,000; or c. an unsaturated polymer precursor having a molecular having a molecular weight of about 100 to about 5000.

46. The process of claim 43, wherein said unsaturated monomer in mixture (ii) is selected from the group consisting of triallyl cyanurate; tolylene diallyl carbamate diallyl isocyanurate, N-methylol acrylamide, acrylamide, methylacrylamide, N-tertiary butyl acrylamide, diacetone acrylamide, triacryl formal, ethyl acrylate, butyl acrylate, vinyl stearate, N-vinyl carbazole, divinylbenzene, divinyl ethylene glycol, maleimide, dimethyl itaconate, acenaphthylene, diallyl phthalate or trimethylol propane trimethacrylate.

47. The process of claim 45, wherein said polymer precursor is a diallyl phthalate prepolymer.

48. The process of claim 37, wherein the unsaturated compound is said mixture (iii) and the amount of double bonds in the unsaturated compound is about $10^{19}$ to about $10^{21}$ per gram, and the proportion of the double bonds in the polymer containing at least two double bonds per molecule is at least 0.1% based on the total double bond content.

49. The process of claim 48, wherein the proportion of double bonds in the polymer containing at least two double bonds per molecule is at least about 1.0% based on the total double bond content.

50. The process of claim 48, wherein the proportion of double bonds in the polymer containing at least two double bonds per molecule is at least 10% but less than 100% based on the total double bond content.

51. The process of claim 43, wherein said unsaturated compound is mixture (ii) and the amount of unsaturated monomer in the mixture is about 0.1 to about 100% by weight based on the polymer.

52. The process of claim 51, wherein said amount is about 1 to about 30% by weight.

53. The process of claim 43, wherein said unsaturated polyester resin (b) is synthesized by esterifying an acid component composed of at least one unsaturated carboxylic acid and a saturated polybasic carboxylic acid with a polyhydric alcohol and wherein said unsaturated polymer precursor (c) is synthesized by polymerizing, to an about 2 to about 50° of polymerization, one or more monomers having two or more double bonds per molecule in which at least one double bond per molecule remains in the precursor.

54. A process for producing a heat-curable multilayer sheet which comprises bonding, without heating and at a room temperature of about 15° to about 25° C, a tacky first layer comprising at least one unsaturated compound which is free radical reactive selected from the group consisting of i. an unsaturated polymer containing at least two double bonds per molecule;

ii. a mixture of an unsaturated polymer containing at least two double bonds per molecule and an unsaturated monomer; or iii. a mixture of an unsaturated polymer containing at least two double bonds per molecule and an unsaturated polymer containing one double bond per molecule, to a second layer comprising a solid or liquid free radical initiator, wherein said composite sheet is capable of being cured by the melting and mixing together of the first and second layers.

55. The process of claim 54, wherein said bonding is accomplished by passing said first and second layers between two rolls having a roll pressure of about 0.5 to about 10 kg/cm².

56. The process of claim 54, wherein said unsaturated polymer containing at least two double bonds per molecule is selected from the group consisting of a. an acryclic unsaturated polymer of the formula

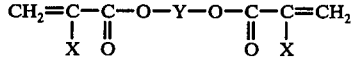

wherein X is a hydrogen atom or a methyl group, and Y is a residue of a member selected from the group consisting of polyesters, polyurethanes, epoxy compounds and polyglycols, which has a molecular weight of not more than about 5,000;

b. an unsaturated polyester resin having a molecular weight of about 1,000 to about 50,000; or c. an unsaturated polymer precursor having a molecular having a molecular weight of about 100 to about 5000.

57. The process of claim 54, wherein said unsaturated monomer in mixture (ii) is selected from the group consisting of triallyl cyanurate, tolylene diallyl carbamate diallyl isocyanurate; N-methylol acrylamide, acrylamide, methylacrylamide, N-tertiary butyl acrylamide, diacetone acrylamide, triacryl formal, ethyl acrylate, butyl acrylate, vinyl stearate, N-vinyl carbazole, divinylbenzene, divinyl ethylene glycol, maleimide, dimethyl itaconate, acenaphthylene, diallyl phthalate or trimethylol propane trimethacrylate.

58. The process of claim 56, wherein said polymer precursor is a diallyl phthalate prepolymer.

59. The process of claim 54 wherein the unsaturated compound is said mixture (iii) and the amount of double bonds in the unsaturated compound is about $10^{19}$ to about $10^{21}$ per gram, and the proportion of the double bonds in the polymer containing at least two double bonds per molecule is at least 0.1% based on the total double bond content.

60. The process of claim 59 wherein the proportion of double bonds in the polymer containing at least two double bonds per molecule is at least about 1.0% based on the total double bond content.

61. The process of claim 59 wherein the proportion of double bonds in the polymer containing at least two double bonds per molecule is at least 10% but less than 100% based on the total double bond content.

62. The process of claim 54, wherein said unsaturated compound is mixture (ii) and the amount of unsaturated monomer in the mixture is about 0.1 to about 100% by weight based on the polymer.

63. The process of claim 62, wherein said amount is about 1 to about 30% by weight.

64. The process of claim 54, wherein said unsaturated polyester resin (b) is synthesized by esterifying an acid component composed of at least one unsaturated carboxylic acid and a saturated polybasic carboxylic acid with a polyhydric alcohol and wherein said unsaturated polymer precursor (c) is synthesized by polymerizing, to an about 2 to about 50° of polymerization, one or more monomers having two or more double bonds per molecule in which at least one double bond per molecule remains in the precursor.

* * * * *